J. ROST.
Wrench.
No. 162,500. Patented April 27, 1875.
FIG. I.
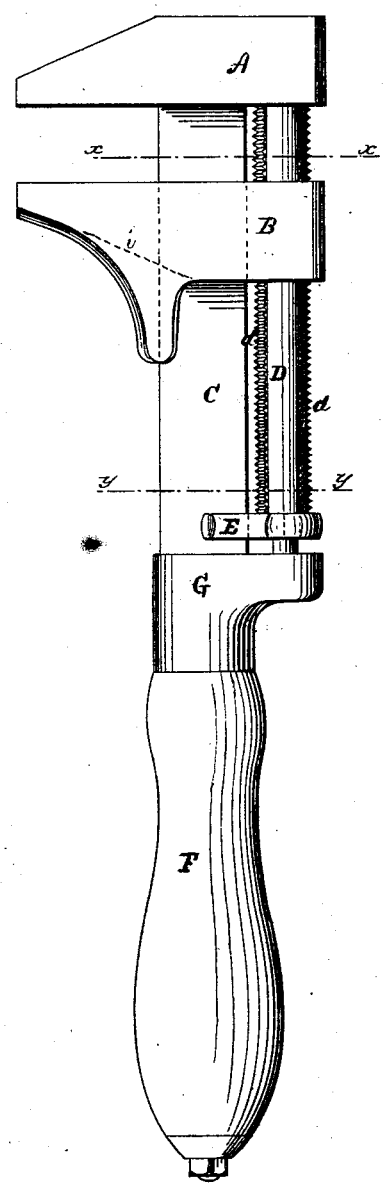
FIG. II.
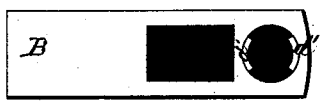
FIG. III.
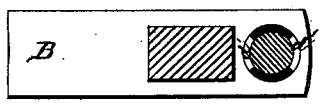
FIG. IV.
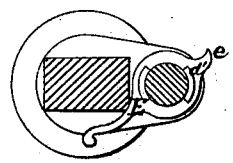
FIG. V.
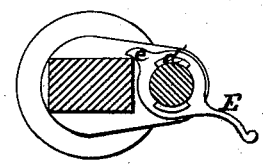
WITNESSES:
INVENTOR:
Julius Rost,
By his atty,
B. F. James.

UNITED STATES PATENT OFFICE.

JULIUS ROST, OF ALLEGHENY, PENNSYLVANIA.

IMPROVEMENT IN WRENCHES.

Specification forming part of Letters Patent No. 162,500, dated April 27, 1875; application filed September 23, 1874.

*To all whom it may concern:*

Be it known that I, JULIUS ROST, of the city of Allegheny and State of Pennsylvania, have invented a new and useful Improvement in Wrenches; and I do hereby declare the following to be a true and correct description of the construction and operation of the same, reference being had to the annexed drawings, making part and parcel of this my specification.

The nature and object of my invention consist in the construction of a metallic wrench in such a manner as to afford the greatest facility in securing and releasing the adjustable head of the wrench upon the bar upon which the adjustable head slides, to prevent the vibration or movement of such movable head while operating, or screwing up or down, the nut.

In order to enable others to make and use my invention, I will describe its construction and operation.

Figure 1 shows a side view of the wrench with the several parts composing it in position, A being the stationary head, firmly attached to the bar C, which passes through the handle F, and secured thereto in the usual manner. B is the movable head, so constructed as to slide easily or freely upon the bar C by reason of an opening that conforms to the shape of such bar, as shown in cross-section in Figs. 2 and 3. D is a screw-rod, the ends of which are secured respectively to the main head A of the wrench and to the metallic heel G, and passing through the hole formed within the movable head B, shown in cross-section in Figs. 2 and 3. The screw-rod has threads d d cut upon it upon its upper and lower sides, as shown in Fig. 1, that engage in corresponding grooves or threads cut in the upper and lower sides of the hole formed in the movable head B, as shown at d' d', Figs. 2 and 3. The screw-rod is operated by means of the arm E attached or secured to it, as shown in Fig. 1, and also shown in cross-section in Figs. 4 and 5. A projection, e, is formed upon the opposite end of the arm E, to limit its movement to a one-quarter turn of the screw-rod. In Fig. 1, the movable head B is securely held by reason of the position of the screw-bar D. The threads cut upon the latter are there shown to be in contact with and fitting into the threads or corresponding grooves cut upon the upper and lower sides of the hole in the head B, through which runs the said screw-bar D. Thus any tendency to vibration of the upper portion of the head B upon the bar C is prevented, and a less quantity of metal rendered necessary upon the upper part of said head B. When the arm E is depressed, the screw upon the bar D is released from contact with the corresponding thread d' d', Fig. 3, and the head is then in a position to slide in either direction upon the bar C, as may be desired.

It will thus be seen that, by giving a quarter turn of the screw-rod D, the head B is secured in position for use, or released for the purpose of being detached from all connection with the nut. It will also be seen that a less quantity of material may, if desired, be used in the construction of the head B, shown in dotted lines i, by reason of the within-described construction and arrangement of the screw-rod D and its connection with both upper and lower sides of head B, in the hole through which such screw-rod passes.

What I claim as my invention, and desire to secure by Letters Patent, is—

The screw-rod D, with the threads d d cut upon its opposite sides with intermediate plain surfaces, and with its arm E, in combination with the head A, head B, rod C, and heel G, in the manner and for the purpose herein described.

JULIUS ROST.

Witnesses:
 HENRY F. EGGERS,
 GUSTAVUS ELBEL.